C. H. ALLISON.
LIQUID FUEL BURNER.
APPLICATION FILED JULY 3, 1918.

1,284,033.

Patented Nov. 5, 1918.

Inventor
Clarence H. Allison
By
Attorneys

UNITED STATES PATENT OFFICE.

CLARENCE H. ALLISON, OF CHICAGO, ILLINOIS.

LIQUID-FUEL BURNER.

1,284,033.   Specification of Letters Patent.   Patented Nov. 5, 1918.

Application filed July 3, 1918. Serial No. 243,182.

*To all whom it may concern:*

Be it known that I, CLARENCE H. ALLISON, a citizen of the United States, residing at Chicago, in the county of Cook and State of Illinois, have invented new and useful Improvements in Liquid-Fuel Burners, of which the following is a specification.

This invention relates to liquid fuel burners in which the fuel is burned in an open pan or tray, and it is the object of the invention to provide in a burner of this kind a novel and improved means for supplying and controlling the air to the burning fuel.

The invention also has for its object to provide a novel improved burner nozzle, with a means for draining the burner pan of any excess fuel which may be delivered thereinto.

The objects stated are attained by means of a combination and arrangement of parts to be hereinafter described and claimed, and in order that the same may be better understood, reference is had to the accompanying drawing forming a part of this specification.

Figure 1:
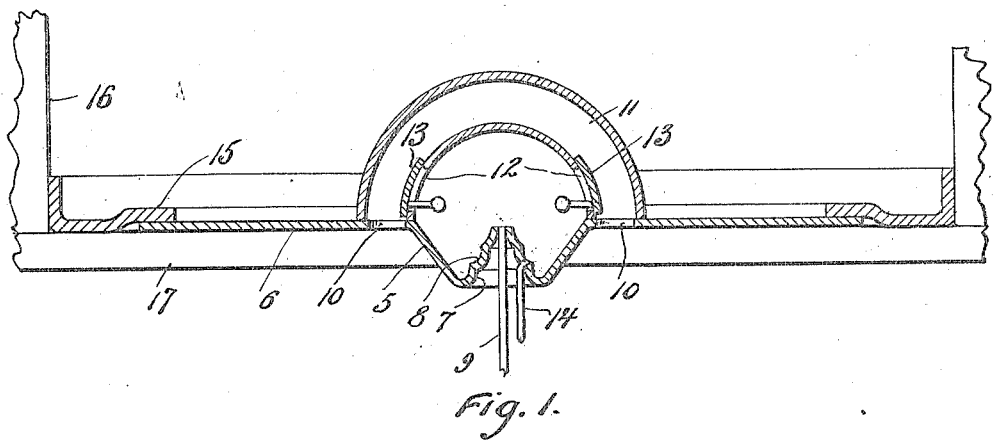
Figure 1 is a central longitudinal section of the burner.
Figure 2:
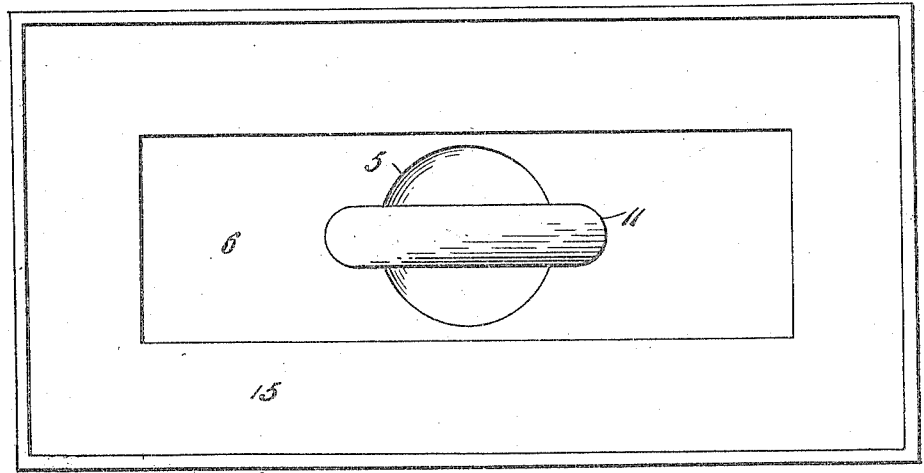
Fig. 2 is a plan view thereof.

Referring specifically to the drawing, 5 denotes an open pan or tray which is formed integral with a base plate 6 from which latter it depends. The pan is frusto-conical in shape and of suitable depth for the purpose for which it is designed, and from its bottom, at the center thereof, rises a hollow conical member 7 which is externally stepped, as shown at 8. The fuel-delivery pipe 9 passes upward through the part 7 and opens through the apex thereof to discharge into the pan 5. The fuel runs down the stepped side of the part 7 and when a sufficient quantity is received in the pan, the burner is started by igniting the oil in the pan. By the stepped contour of the part 7, the flames upon striking back thereon will be deflected sidewise and upward.

On opposite sides of the pan 5, the base plate 6 has air-inlet openings 10, and above the pan, an arched air tube 11 rises from the base plate. This arch straddles the pan 5 and the part 7, and the two legs of the arch seat over the openings 10 so that the air may pass into the arch. On the inner sides of the legs of the arch, close to the base plate 6 are air-outlet openings 12 which face each other and are provided with dampers 13 of any suitable type, to control the air supply. The air is discharged from the openings 12 laterally or sidewise of the arch legs into and across the span under the arch, and above the pan, so that an abundant supply of air for the burning fuel in the pan 5 is provided. The air supply is readily controlled by the dampers 13 according to the size of the flame. The top of the arch gets intensely hot when the burner is in action, which tends to draw air into the arch from below through the openings 10, and the air is forcibly discharged through the outlets 12, resulting in a complete fuel mixture which burns with an intense flame.

Any excess oil delivered to the pan 5 is taken care of by a drain pipe 14 opening into the pan through the side of the part 7 near the base thereof.

An asbestos mat 15 is provided to serve as a marginal insulator against air rising between the edges of the base plate 6 and the walls of the fire box 16 in which the burner is mounted, it being understood that it is supported on the grate 17 so that no changes in the structure of the stove are necessary for the installation of the burner.

I claim:

1. A liquid fuel burner comprising a base plate having air-inlet openings, an arched air tube rising from the base plate and having its ends in open communication with the air-inlet openings, said tube having opposite air-outlet openings in its end portions facing each other and discharging laterally into the space under the arch, a fuel pan depending from the base plate and positioned beneath the arch, and a burner nozzle rising from the bottom of the pan and discharging into the space under the arch.

2. A liquid fuel burner comprising a base plate having air-inlet openings, an arched air tube rising from the base plate and having its ends in open communication with the air-inlet openings, said tube having opposite air-outlet openings in its end portions facing each other and discharging laterally into the space under the arch, a fuel pan depending from the base plate and positioned beneath the arch, a burner nozzle rising from the bottom of the pan and discharging into the space under the arch, and means for controlling the aforesaid air-outlet openings.

In testimony whereof I affix my signature.

CLARENCE H. ALLISON